US009466156B2

(12) United States Patent
Getchius

(10) Patent No.: US 9,466,156 B2
(45) Date of Patent: Oct. 11, 2016

(54) PROCESSING GEOGRAPHIC POSITION DATA ASSOCIATED WITH FLEET VEHICLES

(71) Applicant: Verizon Patent and Licensing Inc., Arlington, VA (US)

(72) Inventor: Jeffrey M. Getchius, Cambridge, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 289 days.

(21) Appl. No.: 14/101,658

(22) Filed: Dec. 10, 2013

(65) Prior Publication Data
US 2015/0161827 A1 Jun. 11, 2015

(51) Int. Cl.
*G01C 17/38* (2006.01)
*G07C 5/02* (2006.01)
*G08G 1/00* (2006.01)
*G06Q 10/08* (2012.01)
*G06Q 10/06* (2012.01)
*G06Q 50/28* (2012.01)
*G05D 1/00* (2006.01)
*G05D 3/00* (2006.01)
*G06F 7/00* (2006.01)
*G06F 17/00* (2006.01)
*G08G 1/123* (2006.01)
*G07C 5/00* (2006.01)

(52) U.S. Cl.
CPC .............. *G07C 5/02* (2013.01); *G06Q 10/063* (2013.01); *G06Q 10/06398* (2013.01); *G06Q 10/08355* (2013.01); *G06Q 50/28* (2013.01); *G08G 1/20* (2013.01); *G06F 7/00* (2013.01); *G07C 5/008* (2013.01)

(58) Field of Classification Search
CPC ................................... G07C 5/02; G06F 7/00
USPC .................................. 701/1, 519; 340/995.1
See application file for complete search history.

(56) References Cited

U.S. PATENT DOCUMENTS

2012/0253548 A1* 10/2012 Davidson .............. G06Q 10/08
701/1

* cited by examiner

Primary Examiner — Helal A Algahaim
Assistant Examiner — Mahmoud Ismail

(57) ABSTRACT

A device may receive multiple position data records. Each of the multiple position data records may identify a geographic position of a vehicle at a particular time. The device may determine, based on the multiple position data records: a first set of time periods during which the vehicle is in motion, and a second set of time periods during which the vehicle is not in motion; determine, based on behavior analysis data, a first type of motion associated with the first set of time periods and a second type of stop associated with the second set of time periods to form behavior metrics; and output the behavior metrics.

20 Claims, 9 Drawing Sheets

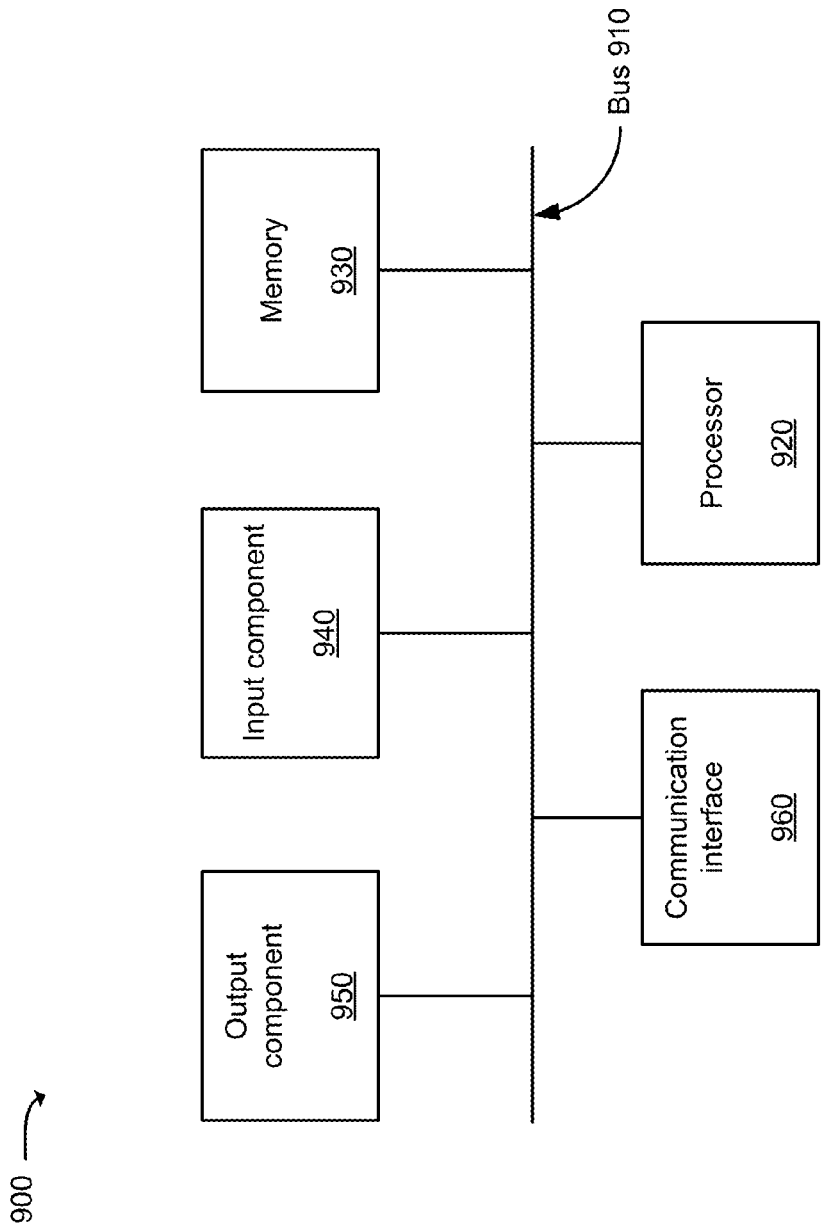

PROCESSING GEOGRAPHIC POSITION DATA ASSOCIATED WITH FLEET VEHICLES

BACKGROUND

Fleet vehicles are often provided by commercial entities for use by workers/employees to locate to job sites to perform job-related functions (e.g., respond to a customer request for service on a product, deliver a product, etc.). Efficiently managing the usage of fleet vehicles can be cumbersome, time consuming, yet critical since inefficient and/or unauthorized use of fleet vehicles can be costly.

BRIEF DESCRIPTION OF THE DRAWINGS

FIG. 9 illustrates example components of one or more devices, according to one or more implementations described herein.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may analyze movement activity of a vehicle (e.g., a commercial or fleet vehicle associated with a company or group) based on geographic position data associated with the vehicle. Based on the geographic position data, an analytics server may perform an analysis to determine the efficiency of vehicle routes, driving behavior, worker productivity, and/or vehicle utilization.

Figure 1:
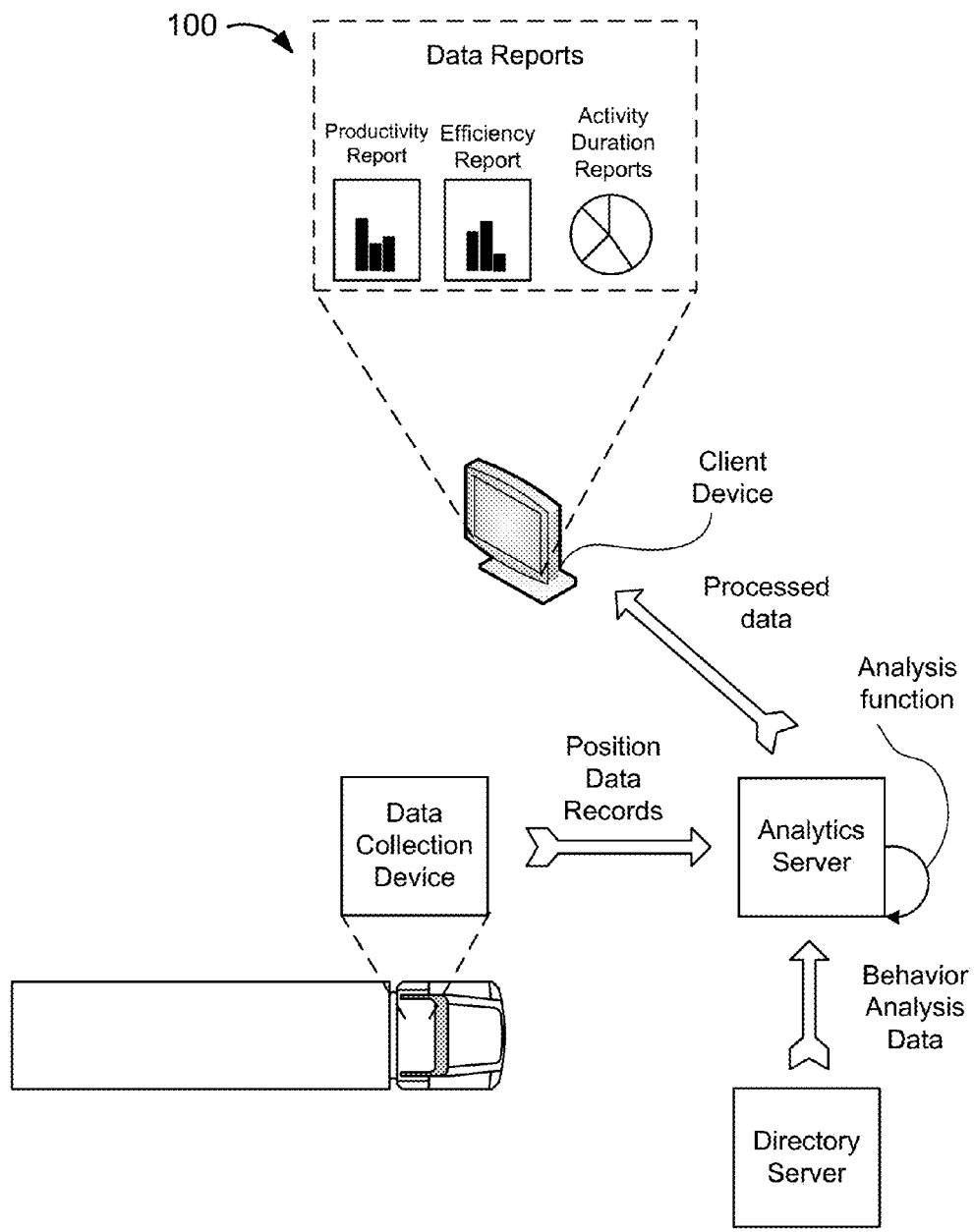
FIG. 1 illustrates an example overview of an implementation described herein.

FIG. 1 illustrates an example overview of an implementation described herein. As shown in FIG. 1, a vehicle may include a data collection device, such as an In-Drive® device connected to an on-board diagnostics system of the vehicle. In some implementations, the data collection device may periodically generate and provide position data records to an analytics server to identify the geographic position of the vehicle at different points in time. In some implementations, a position data record may include a timestamp, an identifier of the vehicle, a geographic position of the vehicle at a time corresponding to the timestamp, and/or some other information relating to the vehicle (e.g., a driver associated with the vehicle, a fleet, company, or organization associated with the vehicle, etc.). In some implementations, the analytics server may receive behavior analysis data (e.g., from a directory server) that may be used to categorize vehicle moment activity.

Based on the position data records and the behavior analysis data, the analytics server may perform an analysis function, and may display the analysis to map the vehicle's driving route and characterize segments of the vehicle's driving route. For example, the analytics server may identify time periods and locations in which the vehicle made a stop. Further, the analytics server may characterize the stop (e.g., as a job-related stop or a non-job-related stop, such as a stop relating to a personal errand, a lunch break, or the like).

As an example, the analytics server may identify a stop when position data records identify the same geographic position, and/or when the analytics server does not receive position data records after a particular amount of time (e.g., indicating that the vehicle has been powered off when position data records are provided when the vehicle is powered on). Based on behavior analysis data that identifies the geographic position corresponding to a job site (e.g., a location where a job is to be performed and/or where a product delivery is to be made based on a job log/schedule), the analytics server may determine that the geographic position identified in the position data records corresponds to a job site and that the stop may be associated with a stop relating to a job. In some implementations, the analytics server may store information identifying a duration of the stop (e.g., based on when a stop is identified and when vehicle movement is later identified), and may store information identifying the type of stop.

In some implementations, the analytics server may characterize movement activity associated with the vehicle (e.g., as job-related movement activity when the vehicle is driven to a job site). In some implementations (e.g., based on characterizing stops and movement activity), the analytics server may determine behavior metrics, such as an amount of time that a vehicle has been stopped at a job site, an amount of time the vehicle has been stopped at non-job locations (e.g., locations relating to personal errands, lunch breaks, etc.), an amount of time that the vehicle's engine has idled (e.g., when the vehicle's engine is powered on and when the vehicle is not moving), an amount of driving time to a job site, an amount of driving time to a non-job location, a number of times the vehicle has returned to a particular job site, and/or some other behavior metric relating to the vehicle's stoppage and movement activity.

In some implementations, the analytics server may process the behavior metrics to form processed data that may be provided to a client device for presentation on a display associated with the client device. In some implementations, the processed data may identify a measure of productivity (e.g., based on a number of job-related stops made), efficiency (e.g., based on distance traveled per job-related stop, vehicle idle time (e.g., when the vehicle's engine is powered on and the vehicle is not moving), a number of repeat stops to a particular job site, a number of non-job-related stops made, etc.), and/or some other type of measurement. In some implementations, the processed data my further identify risky driving based on the speed of the vehicle and a calculated safe speed (e.g., based on speed limits, a complexity of the vehicle's route, etc.). In some implementations, the processed data and/or the behavior metrics may be provided for display on a client device in the form of a report (e.g., a productivity report, an efficiency report, a stoppage activity report, a movement activity report, etc.).

In some implementations, the analytics server may determine behavior metrics for different periods of time for a vehicle and/or for a group vehicles associated with a particular fleet, company, or organization. In some implementations, behavior metrics for one vehicle or group of vehicles may be compared to behavior metrics for another vehicle or group of vehicles. Based on the behavior metrics, the analytics server may determine the efficiency of vehicle routes, driving behavior, worker productivity, vehicle utilization, etc. (e.g., to identify inefficient driving routes, unproductive workers, repeated stops for a particular job site, etc.).

While the systems and/or methods, described herein, describe generating behavior metrics and/or processed data based on position data records associated with fleet vehicles, in practices the systems and/or methods may apply to generating behavior metrics and/or processed data based on position data records associated with any time of vehicle (e.g., passenger vehicles, public transport vehicles, etc.).

Figure 2:
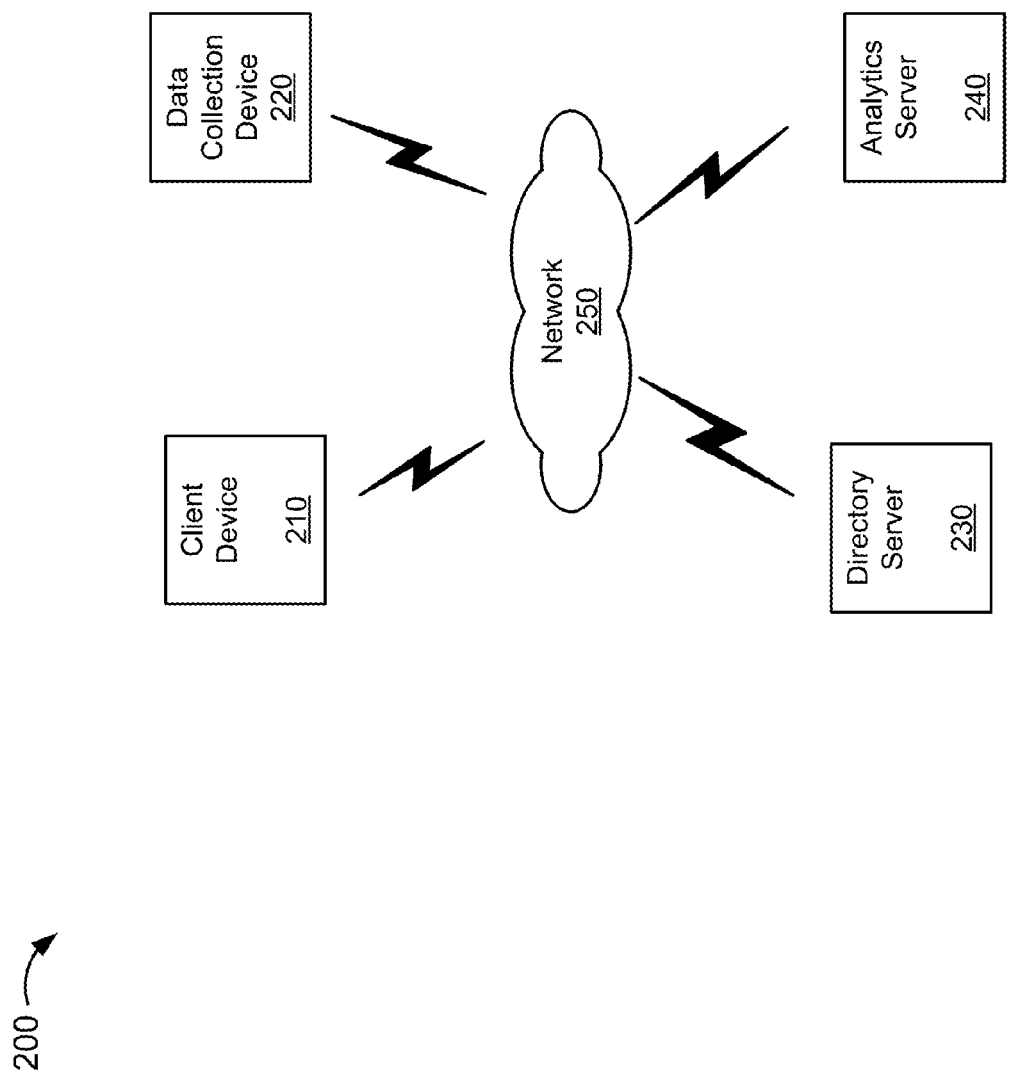
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include client device 210, data collection device 220, directory server 230, analytics server 240, and network 250.

Client device 210 may include a device capable of communicating via a network, such as network 250. For example, client device 210 may correspond to a mobile communication device (e.g., a smart phone or a personal digital assistant (PDA)), a portable computer device (e.g., a laptop or a tablet computer), a desktop computing device, a server device, or another type of computing device. In some implementations, client device 210 may receive processed data, corresponding to behavior metrics of one or more vehicles, from analytics server 240 and may present the processed data as reports from within an application and/or a user interface of client device 210. In some implementations, client device 210 may receive a request for the processed data (e.g., from a user via the user interface) and may provide the request to analytics server 240 in order to receive the processed data. In some implementations, the request may identify a time period, one or more vehicles, and particular behavior metrics requested (e.g., behavior metrics that identify a number of job-related stops made, a duration of the job-related stops, a number of kilometers driven to job sites and non-job-related locations, etc.). Examples of presentations of the behavior metrics in reports are described below with respect to FIGS. 5-8.

Data collection device 220 may include a geographic position locator device and may form position data records identifying the geographic position of an associated vehicle. In some implementations, data collection device 220 may connect with a diagnostics system of the vehicle (e.g., an on-board diagnostics (OBD) system, an OBD II system, or the like) and may be powered on to generate the position data records when the vehicle is powered on (e.g., when the vehicle's ignition is switched to the "on" position to power on the engine of the vehicle). In some implementations, data collection device 220 may periodically generate position data records and may provide the position data records to analytics server 240 to identify the geographic position of the vehicle at different points in time. For example, data collection device 220 may generate and provide position data records every minute, two minutes, five minutes, or at some other interval when the vehicle is powered on. As described above, each data record may include a timestamp, information identifying a vehicle and/or a driver of the vehicle, and a geographic location of the vehicle at a time corresponding to the timestamp. In some implementations, data collection device 220 may provide position data records having some other information, such as diagnostics data received from the vehicle diagnostics system.

Directory server 230 may include one or more computing devices, such as a server device or a collection of server devices. In some implementations, directory server 230 may store behavior analysis data that identifies geographic positions associated with a job site (e.g., a customer facility, an office, or the like). Additionally, or alternatively, directory server 230 may store information that identifies points of interests, such as merchants, restaurants, etc. In some implementations, the behavior analysis data may store routines associated with a vehicle (e.g., routines that identify locations where the vehicle frequently makes stops and time periods in which these stops are made).

In some implementations, behavior analysis data stored by directory server 230 may be provided to analytics server 240 to categorize vehicle activity (e.g., categorize activity as job-related, non-job-related, etc.) based on a geographic position of a vehicle, information identifying job sites and/or points of interest stored by directory server 230, and/or information identifying routine stops made by a vehicle). In some implementations, directory server 230 may store information that may be used (e.g., in conjunction with position data records that identify the geographic position of a vehicle at different points in time) to measure driver risk. For example, directory server 230 may store information identifying speed limits and/or mapping data that identifies the complexity of driving routes (e.g., based on a number of turns, curvature measurements of the turns, narrowness of roads, traffic density, a ratio of driving distance in the route to straight-line distance between an origin and destination the route, etc.).

Analytics server 240 may include one or more computing devices, such as a server device or a collection of server devices. In some implementations, analytics server 240 may receive position data records that identify the geographic position of a vehicle at different points in time. Further, for a given period of time, analytics server 240 may identify movement activity of the vehicle based on the position data records. For example, analytics server 240 may identify locations and an amount of time that the vehicle has been driven, a driving speed of the vehicle during a particular period of time, and locations and an amount of time that the vehicle has stopped. In some implementations, analytics server 240 may characterize segments of the movement activity based on behavior analysis data received from directory server 230. For example, analytics server 240 may characterize a vehicle stop as a job-related stop, a non-job-related stop (e.g., a stop relating to a lunch break, a personal errand, etc.), an idling stop (e.g., when analytics server 240 receives position data records identifying multiple consecutive time periods in which the vehicle is located in the same geographic position), and/or some other type of stop.

In some implementations, analytics server 240 may characterize a driving segment between two stops as a job-related driving segment (e.g., when the vehicle is driven to a job site) or a non-job-related driving segment (e.g., "Lunch Break" driving segment, a "Personal Errand" driving segment, etc.). In some implementations, analytics server 240 may determine driver risk based on vehicle speed (e.g., as determined by the position data records) and driver risk related information received from directory server 230 (e.g., speed limits and/or mapping data that identifies the complexity of driving routes).

Network 250 may include one or more wired and/or wireless networks. For example, network 250 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 250 may include a local area network (LAN), a wide area network (WAN), a metropolitan network (MAN), the Public Switched Telephone Network (PSTN), an ad hoc network, a managed Internet Protocol (IP_network, a virtual private network (VPN), an intranet, the Internet, a fiber optic-based network, and/or a combination of these or other types of networks.

The quantity of devices and/or networks in environment 200 is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
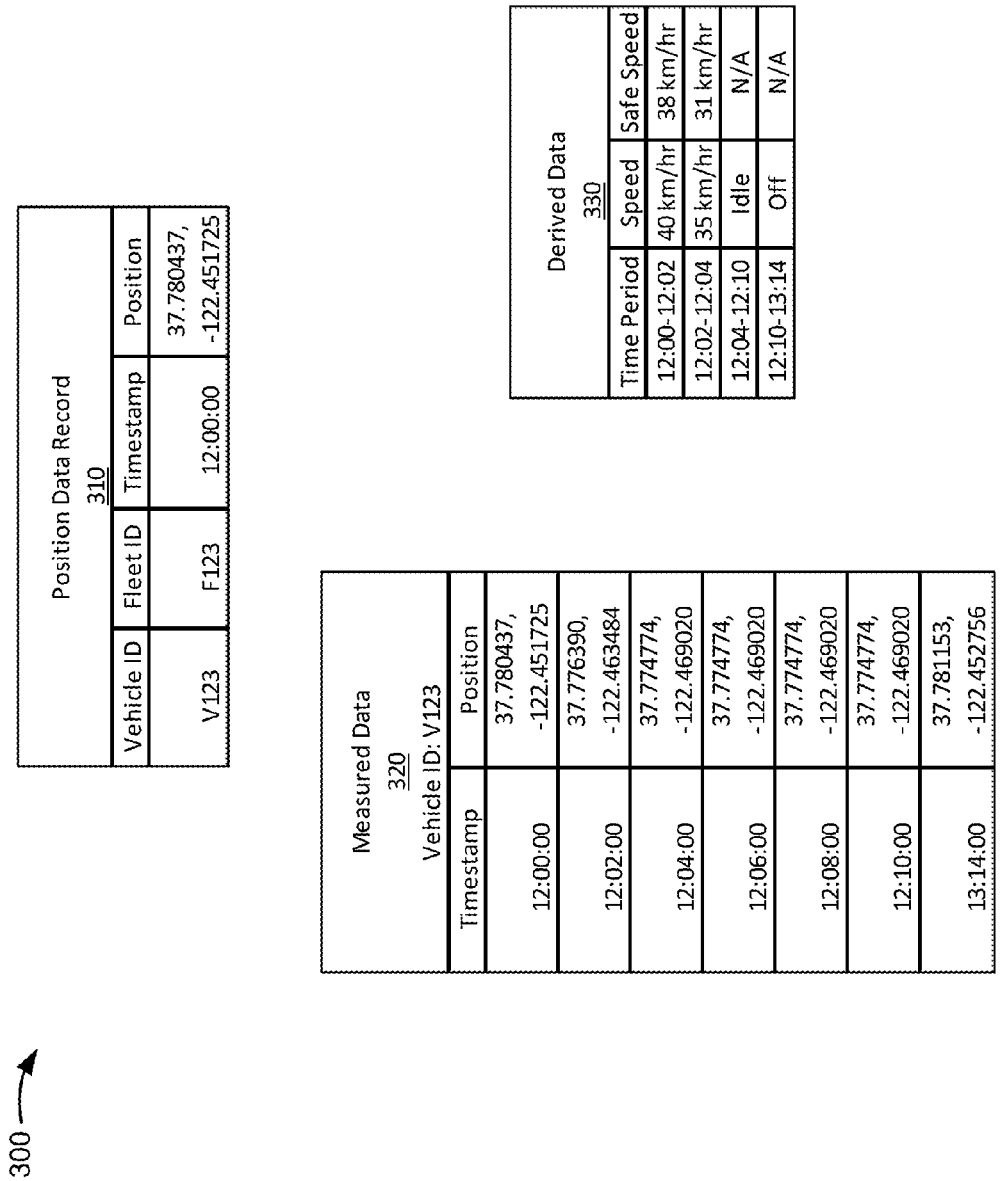
FIG. 3 illustrates an example data structure that may be stored by one or more devices in the environment of FIG. 2.

FIG. 3 illustrates an example data structure 300 that may be stored by one or more devices in environment 200, such as data collection device 220 and/or analytics server 240. In some implementations, data structure 300 may be stored in a memory of data collection device 220 and/or analytics server 240. In some implementations, data structure 300 may be stored in a memory separate from, but accessible by, data collection device 220 and/or analytics server 240 (e.g., a "cloud" storage device). In some implementations, data structure 300 may be stored by some other device in environment 200, such as client device 210 and/or directory server 230. A particular instance of data structure 300 may contain different information and/or fields than another instance of data structure 300.

As shown in FIG. 3, data structure 300 may include position data record 310, measured data 320, and derived data 330. Position data record 310 may store information included in a data record generated by data collection device 220. As shown in FIG. 3, a data record may include a vehicle identifier (ID) associated with a vehicle connected to data collection device 220 (e.g., via an onboard diagnostics system), a fleet ID associated with the vehicle (e.g., an ID of a fleet, a company, an organization, or another group associated with the vehicle), a timestamp, and a longitude/latitude coordinates that identify a geographic position of the vehicle at a time corresponding to the timestamp. In some implementations, analytics server 240 may store multiple position data records generated by data collection device 220 to identify the geographic position of the vehicle at different points in time.

Measured data 320 may store a collection of position data records 310 to identify the geographic position of a particular vehicle at different points in time based on multiple position data records 310 received by analytics server 240 from data collection device 220. Another instance of measured data 320 may store information identifying the geographic position of another vehicle at different points in time. In some implementations, measured data 320 may store information identifying the particular vehicle in a header portion as shown in FIG. 3. In some implementations, measured data 320 may store information identifying multiple timestamps and geographic positions of the particular vehicle at times corresponding to the timestamps. Based on information stored by measured data 320, analytics server 240 may map the particular vehicle's route, identify the particular vehicle's driving speed, identify vehicle stops, and determine some other information regarding the activity of the particular vehicle.

Derived data 330 may store information identifying vehicle speed during different time periods (e.g., segments) corresponding to information stored by measured data 320. Each entry in derived data 330 may correspond to a particular time period. For example, derived data 330 may store a first time period of 12:00-12:02 corresponding to position data records 310 identifying the geographic position of a particular vehicle at one or more times within the 12:00-12:02 time period. Further, derived data 330 may store information identifying a speed of the particular vehicle during the time period. For example, the speed may correspond to a distance traveled by the vehicle based on information stored by measured data 320. In an example shown in FIG. 3, measured data 320 may store information identifying that at 12:00:00, the particular vehicle was located at the geographic position identified by the longitude/latitude coordinates of 37.780437, −122.451725 and at 12:02:00, the particular vehicle was located at the geographic position identified by the longitude/latitude coordinates of 37.776390, −122.463484. In some implementations, analytics server 240 may determine a distance between the two geographic positions, and determine a speed by dividing the distance by 2 minutes (e.g., since the distance was traveled in a 2 minute time period). In some implementations, derived data 330 may store information identifying the speed (e.g., 40 km/hr) as determined by analytics server 240 based on information stored by measured data 320.

In some implementations, derived data 330 may store information identifying that the particular vehicle was stopped during a particular time period. For example, when multiple consecutive position data records 310 identify the same geographic position, derived data 330 may store information to reflect that the vehicle was stopped during the time period associated with the multiple consecutive position data records 310. Further, when multiple consecutive position data records 310 at regular intervals (e.g., two minute intervals) identify the same geographic position, derived data 330 may store information to reflect that the vehicle was in an idle state.

In an example shown in FIG. 3, derived data 330 may store information to identify that the vehicle was in an idle state from 12:04-12:10 since position data records 310 from 12:04-12:10 indicate that the vehicle did not move (e.g., as shown in measured data 320). Further, since measured data 320 stores consecutive position data records 310 from 12:04-12:10 at regular intervals, analytics server 240 may determine that the vehicle was powered on (e.g., since position data records 310 may be provided when the vehicle is powered on).

As another example, derived data 330 may store information to identify that the vehicle was powered off from 12:10-13:14 (e.g., since measured data 320 does not store the geographic position of the vehicle from 12:10-13:14, indicating that position data records 310 were not generated by data collection device 220 and that the vehicle was powered off). As described in greater detail below, analytics server 240 may characterize the time periods in which the vehicle was moving and time periods in which the vehicle was stopped. For example, analytics server 240 may characterize the time periods as job-related, non-job-related, etc.

In some implementations, derived data 330 may further store information identifying a safe speed for the route traveled by the particular vehicle during the particular time period. In some implementations, the safe speed may be based on information identifying a complexity of the route, such as a number of turns, curvature measurements of the turns, narrowness of roads, traffic density, a ratio of driving distance in the route to straight-line distance between an origin and destination the route, etc. In some implementations, the information identifying the complexity of the route and/or speed limits associated with the route may be based on mapping data stored by directory server 230. As described in greater detail below with respect to FIG. 6, analytics server 240 may determine the safe speed based on the information identifying the complexity of the route.

While particular fields are shown in a particular format in data structure 300, in practice, data structure 300 may include additional fields, fewer fields, different fields, or differently arranged fields than are shown in FIG. 3. Also, FIG. 3 illustrates examples of information stored by data structure 300. In practice, other examples of information stored by data structure 300 are possible.

Figure 4:
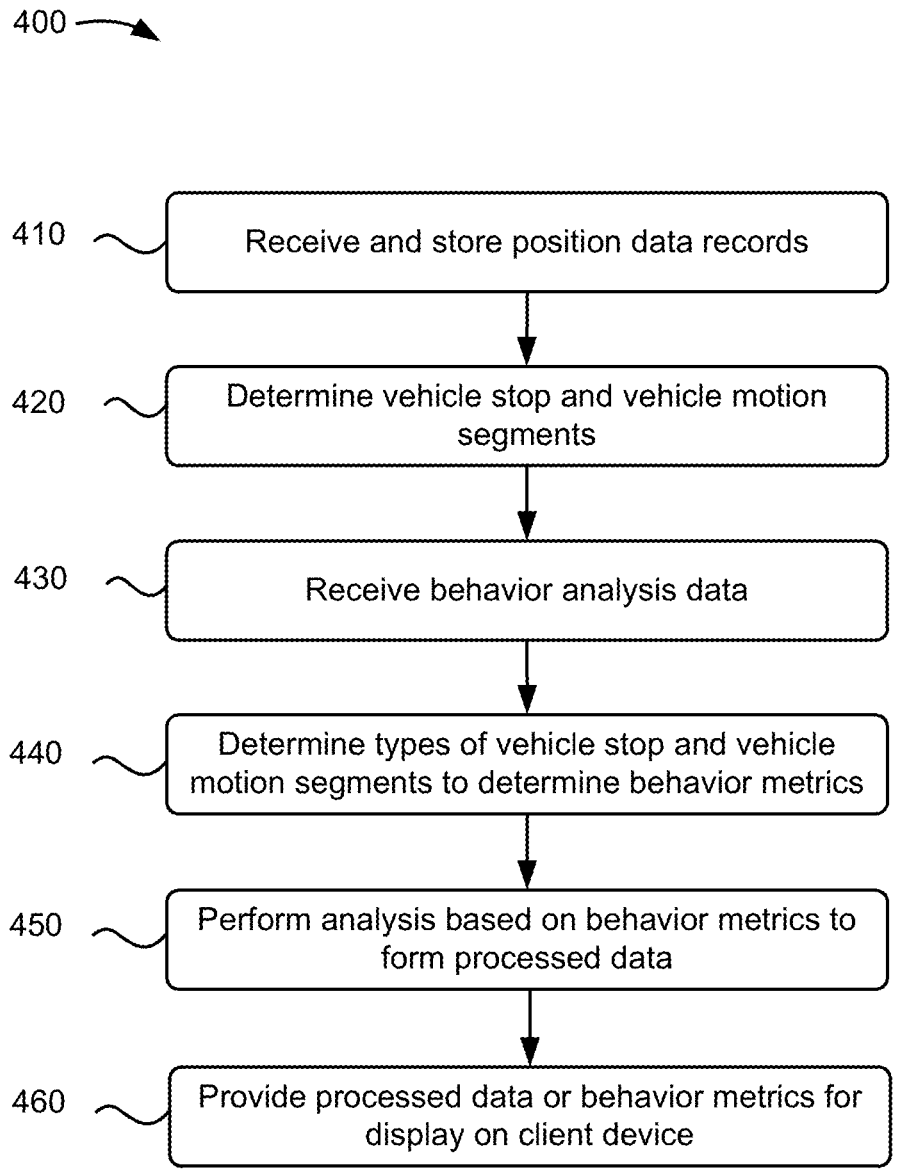
FIG. 4 illustrates a flowchart of an example process for determining and processing behavior metrics.

FIG. 4 illustrates a flowchart of an example process 400 for determining and processing behavior metrics. In one implementation, process 400 may be performed by one or more components of analytics server 240. In another implementation, some or all of blocks of process 400 may be performed by one or more components of another device in environment 200 (e.g., client device 210, data collection device 220, and/or directory server 230), or a group of devices including or excluding analytics server 240.

As shown in FIG. 4, process 400 may include receiving and storing position data records (block 410). For example, analytics server 240 may receive position data records, from data collection device 220, that identify the geographic position of a particular vehicle, connected to data collection device 220 (e.g., via an on-board diagnostics system, or the like), at different points in time. In some implementations, data collection device 220 may generate the position data records at regular intervals (e.g., recurring, periodic intervals, such as two minute intervals, five minute intervals, or some other interval) when the particular vehicle is powered on. In some implementations, data collection device 220 may periodically or intermittently provide the position data records to analytics server 240. Additionally, or alternatively, data collection device 220 may store the position data records and may provide the position data records based on receiving a request for the position data records from analytics server 240.

In some implementations, data collection device 220 may provide the position data records via a wireless connection, such as a cellular connection and/or some other type of wireless connection. Additionally, or alternatively, data collection device 220 may provide the position data records to analytics server 240 via a wired connection. As described above, a data record may include a vehicle ID associated with the vehicle connected to data collection device 220, a fleet ID associated with the vehicle (e.g., an ID of a fleet, a company, an organization, or another group associated with the vehicle), a timestamp, and a longitude/latitude coordinates that identify a geographic position of the vehicle at a time corresponding to the timestamp. Additionally, or alternatively, the data record may include some other information associated with the vehicle, such as diagnostics data received from the on-board diagnostics system.

Process 400 may also include determining vehicle stop and vehicle motion segments (block 420). For example, analytics server 240 may determine time periods (e.g., segments) in which the particular vehicle was stopped and when the vehicle was in motion based on the position data records. In some implementations, analytics server 240 may determine time periods when the vehicle was in motion when multiple consecutive position data records (e.g., position data records whose timestamps are separated by a regular interval) identify different positions. In some implementations, analytics server 240 may determine time periods when the vehicle was stopped (e.g., powered on and idling) when multiple consecutive position data records identify the same geographic position (e.g., indicating that the vehicle was idling). Additionally, or alternatively, analytics server 240 may determine time periods when the vehicle was stopped (e.g., powered off) when the consecutive position data records, stored in measured data 320 are not continuous (e.g., when a gap exists in between the timestamps in consecutive position data records, such as when the interval between the timestamps is greater than the regular interval at which position data records are received when the vehicle is powered on).

Process 400 may further include receiving behavior analysis data (block 430). For example, analytics server 240 may receive behavior analysis data from directory server 230. In some implementations, the behavior analysis data may include information identifying geographic positions of job sites (e.g., based on a job log), geographic positions of points of interest (e.g., restaurants, merchants, consumer service providers, etc.) associated with non-job-related stops, mapping data that identifies road complexity, and/or some other information that may be used to categorize the vehicle stop and vehicle motion segments. Additionally, or alternatively, the behavior analysis data may include information identifying a length of time and/or a time of day. Additionally, or alternatively, the behavior analysis data may include information associated with a vehicle, a driver or worker associated with the vehicle, a group of vehicles in a same fleet or organization, etc. In some implementations, the behavior analysis data may be manually provided by an administrator and may be used to characterize vehicle movement and vehicle stoppage activity.

Process 400 may also include determining types of vehicle stop and vehicle motion segments to determine behavior metrics (block 440). For example, analytics server 240 may determine the types of the vehicle stop segments as job-related stops or non-job-related stops. In some implementations, analytics server 240 may characterize a stop segment (e.g., determine a type of the stop segment) as a job-related stop when the geographic position, identified in a corresponding data record used to identify the stop segment, is within a threshold distance of the geographic position of a job site, as identified by the behavior analysis data. In some implementations, analytics server 240 may characterize the vehicle stop segment a non-job-related stop when the geographic position, identified in a corresponding data record, is not associated with a job site and/or when the geographic position corresponds to a location that is associated with non-job-related stops. Further, analytics server 240 may characterize the non-job-related stop as a "Lunch" stop, a "Personal Errand" stop, or some other type of stop that identifies a name of a merchant, building, or venue associated with the stop based on point of interest information included in the behavior analysis data.

As an example, analytics server 240 may characterize a stop as a "Lunch" stop based on the geographic location associated with the stop, the geographic location of a restaurant venue, a time of day corresponding to a "Lunch" stop, and/or a length of time of the stop that is associated with the length of time of a "Lunch" stop. As described above, the behavior analysis data may correspond to a time of day and/or a length of time associated with a stop. In some implementations, the time of day in which a stop is made by the vehicle may correspond to a "Lunch" stop. For example, when multiple vehicles in the same group routinely make a stop at a particular time of day and at a restaurant venue, analytics server 240 may correlate the particular time of day and the length of time with a "Lunch" stop. Additionally, or alternatively, an administrator of analytics server 240 may provide information to analytics server 240 to identify that a stop at a particular time of day and having a particular time of length may relate to a "Lunch" stop.

As another example, analytics server 240 may characterize a stop as a "Personal Errand" stop based on the geographic location associated with the stop, information identifying the geographic location of a venue associated with a personal errand (e.g., a store, a consumer services venue, etc.), the time of day associated with a personal errand, and a length of time of the stop that is associated with the length of time of a "Personal Errand" stop. In some implementations, analytics server 240 may differentiate between a "Lunch" stop and another type of stop, such as a "Snack" stop based on the length of time of the stop. For example, a "Lunch" stop may be determined when the length of the time of the stop is over a particular threshold (e.g., a 30 minute threshold or some other threshold), whereas a "Snack" stop may be determined when the length of the time of the stop is under a particular threshold. In some implementations, analytics server 240 may characterize a stop segment as an idle stop segment (e.g., when multiple consecutive position data records identify the same geographic position, thereby indicating that the vehicle was powered on but did not move).

In some implementations, analytics server 240 may determine behavior metrics based on determining the types of vehicle stop segments and the vehicle motion segments. For example, analytics server 240 may determine behavior metrics such as geographic positions at which the vehicle was idle, an amount of time in which the vehicle was idle at each geographic position, an amount of time the vehicle was stopped at a job site, the amount of time that the vehicle was stopped at non-job site, the amount of time that the vehicle was in motion to a job site, mileage driven to a job site, the amount of time that the vehicle was in motion to a non-job site, mileage driven to a non-job site, a speed of the vehicle during a particular motion segment, and/or some other type of behavior metric that relates to where the vehicle was driven, where the vehicle was stopped, the type of stop that was made, and how long the stop lasted.

Process 400 may further include performing an analysis based on the behavior metrics to form processed data (block 450). For example, analytics server 240 may perform a route analysis to map the motion segments and stop segments on a map (e.g., to identify on the map where the vehicle was driven and where the vehicle was stopped). In some implementations, analytics server 240 may perform an efficiency analysis to determine a measure of efficiency associated with the vehicle during a particular time period. In some implementations, the measure of efficiency may be based on the total amount of time that the vehicle was stopped at one or more job sites, a total amount of time/mileage that the vehicle was driven, and/or a total amount of time the vehicle was stopped at non-job-related sites. In some implementations, the measure of efficiency may identify a percentage of time that a driver or worker, associated with the vehicle, spent at job sites in relation to the amount of time that the driver or worker spent at non-job sites and/or driving. In some implementations, the measure of efficiency may identify a number of kilometers driven per job stop (e.g., to identify inefficient driving routes).

In some implementations, analytics server 240 may measure vehicle utilization based on the vehicle's mileage associated with traveling to a job site in relation to the vehicle's total mileage capacity. In some implementations, the measure of vehicle utilization may be used to identify over-utilized or under-utilized vehicles. In some implementations, analytics server 240 may measure worker productivity based on a number of job-related stops made in relation to non-job-related stops made and/or non-job-related mileage.

In some implementations, analytics server 240 may perform a driver risk analysis based on a derived speed of the vehicle (e.g., a speed derived from the position data records and stored by derived data 330) during different motion segments and a calculated safe speed based on the behavior analysis data, such as speed limits and/or road complexities of roads on which the vehicle was driven (e.g., a number of turns, curvature measurements of the turns, narrowness of roads, traffic density, a ratio of driving distance in the motion segment to straight-line distance between an origin and destination the motion segment, etc.). In some implementations, analytics server 240 may measure driver based on a ratio between the derived speed and the calculated safe speed.

In some implementations, analytics server 240 may perform some other type of analysis not described above based on the behavior metrics and/or the behavior analysis data. In some implementations, analytics server 240 may perform a particular type of analysis (e.g., an efficiency analysis, a driver risk analysis, etc.) based on receiving a request for the particular type of analysis. In some implementations, the request for the particular type of analysis may identify a time period, a particular vehicle, and/or a particular group of vehicles whose behavior metrics are to be analyzed within the time period.

Process 400 may also include providing the processed data or behavior metrics for display on a client device (block 460). For example, analytics server 240 may provide the processed data or behavior metrics for display on client device 210. As described in greater detail below with respect to FIGS. 5-8, the processed data and/or the behavior metrics may be displayed as reports, charts, or the like in a user interface of client device 210. For example, the behavior metrics may displayed in a chart to show an amount of time that the vehicle was stopped at a job site in relation to an amount of time that the vehicle was stopped at a non-job site. In some implementations, the processed data may be displayed in a mapping application to map motion segments and stop segments associated with the vehicle. In some implementations, the processed data and/or the behavior metrics of one or more vehicles may be compared to the processed data and/or the behavior metrics of one or more other vehicles (e.g., to compare efficiency, productivity, driver risk, etc. of one or more vehicles with the efficiency, productivity, driver risk, etc., of the one or more other vehicles).

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel.

Figure 5:
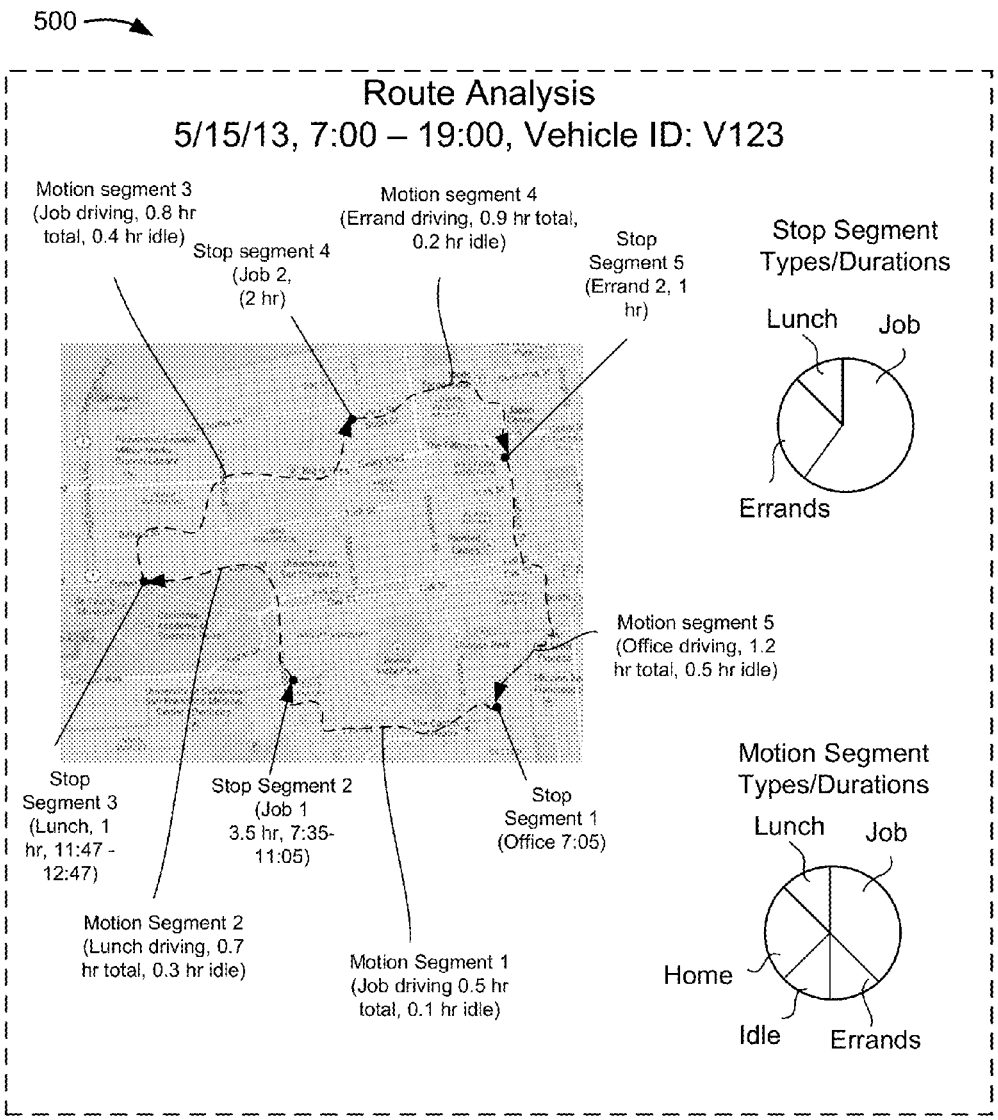
FIGS. 5-8 illustrates example implementations as described herein.

FIG. 5 illustrates an example implementation as described herein. In some implementations, FIG. 5 may correspond to an example of a route analysis corresponding to an example presentation of processed data and/or behavior metrics received by client device 210 and displayed on interface 500 of client device 210. As shown in interface 500, client device 210 may display (e.g., on a map) a route analysis of a particular vehicle during a particular time period. In some implementations, the route analysis may identify motion segments (e.g., where the particular vehicle was driven) and/or stop segments (e.g., where the vehicle was stopped). Further, the route analysis may identify characteristics of the motion segments (e.g., how long the vehicle was driven for each segment, how long the vehicle was idle for each segment, a time in which the vehicle began driving and when the vehicle made a stop, and/or a description or type of the motion segment, such as job-related motion segment, a non-job-related motion segment, etc.). Further, the route analysis may identify characteristics of the stop segments (e.g., how long each stop segment lasted, and/or a description or type of each job segment, such as a job-related stop, a non-job-related stop, the name of a venue at which the vehicle was stopped, etc.). In some implementations, the route analysis may identify stop segments as instances when the vehicle made a stop and was powered off or when the vehicle idled greater than a particular threshold. In some implementations, the route analysis may identify idle stops that last less than a particular threshold amount of time as part of a motion segment (e.g., when the idle stops relate to traffic stops, or the like, such as when the vehicle idles when en route to a particular destination).

In the example shown in FIG. 5, interface 500 may display a route analysis of the vehicle having the vehicle ID of V123 during the time period of May 15, 2013, 7:00-19:00. As shown in FIG. 5, the route analysis may identify a first stop segment having the description "Office" (e.g., an office location of a driver of the vehicle) to indicate that the vehicle was stopped at the "Office" location (e.g., based on a data record that identifies a geographic position corresponding to the "Office" location based on behavior analysis data stored by directory server 230). Further, the route analysis may identify a first motion segment (i.e., motion segment 1) corresponding to the vehicle departing the "Office" location and arriving at a stop location corresponding to a second stop segment. In some implementations, the route analysis may identify characteristics of stop segment 2, such as "Job 1" to indicate that the stop segment was related to a job (e.g., when the geographic position of stop segment 2 corresponds to the geographic position of a job site as identified by the behavior analysis data).

Further, the route analysis may identify a duration of the stop segment, and a time period associated with the stop segment (e.g., when the vehicle made the stop and when the vehicle departed from the stop). Further, the route analysis may characterize motion segment 1, such as "Job driving" to indicate that the driving from stop segment 1 to stop segment 2 was related to a job. Further, the route analysis may identify a duration of motion segment 1 (e.g., how long the vehicle traveled during motion segment 1) and a total duration of time in which the vehicle was idle (e.g., an idle time). In some implementations, the idle time may be used to identify inefficient and/or high traffic motion segments/routes.

In a similar manner, the route analysis may identify all motion and stop segments during the time period of May 15, 2013 from 7:00-19:00 for the vehicle having the vehicle ID of "V123." For example, the route analysis may identify and characterize a stop segment as a "Lunch" stop when the vehicle is stopped at a restaurant or similar venue during a designated lunch break period. In some implementations, the designated lunch break period may be based on behavior analysis data that identifies the lunch break period of the driver of the vehicle. Additionally, or alternatively, the behavior analysis data may identify that the driver of the vehicle routinely makes a stop at the same location at a similar time. Based on the behavior analysis data, analytics server 240 may identify the stop as a "Lunch" stop since the vehicle routinely makes a stop at the same location at a similar time.

In some implementations, the route analysis may identify and characterize a stop segment as an "Errand" stop segment when the vehicle is stopped at a merchant, a consumer services venue, or the like and is not related to a job site. In some implementations, and as shown in FIG. 5, the route analysis may include a chart (e.g., a pie-chart, a bar graph, etc.) that may identify durations of the stop segments and motion segments by type.

While a particular example is shown in FIG. 5, the above description is merely an example implementation. In practice, other examples are possible from what is described above in FIG. 5. For example, a route analysis of a different time period than described above may be presented. Further, a route analysis of multiple vehicles (e.g., vehicles associated with a particular fleet, company, organization, etc.) may be presented. Also, while a particular format of interface 500 is shown, in practice, interface 500 may have a different format and appearance than what is shown in FIG. 5.

Figure 6:
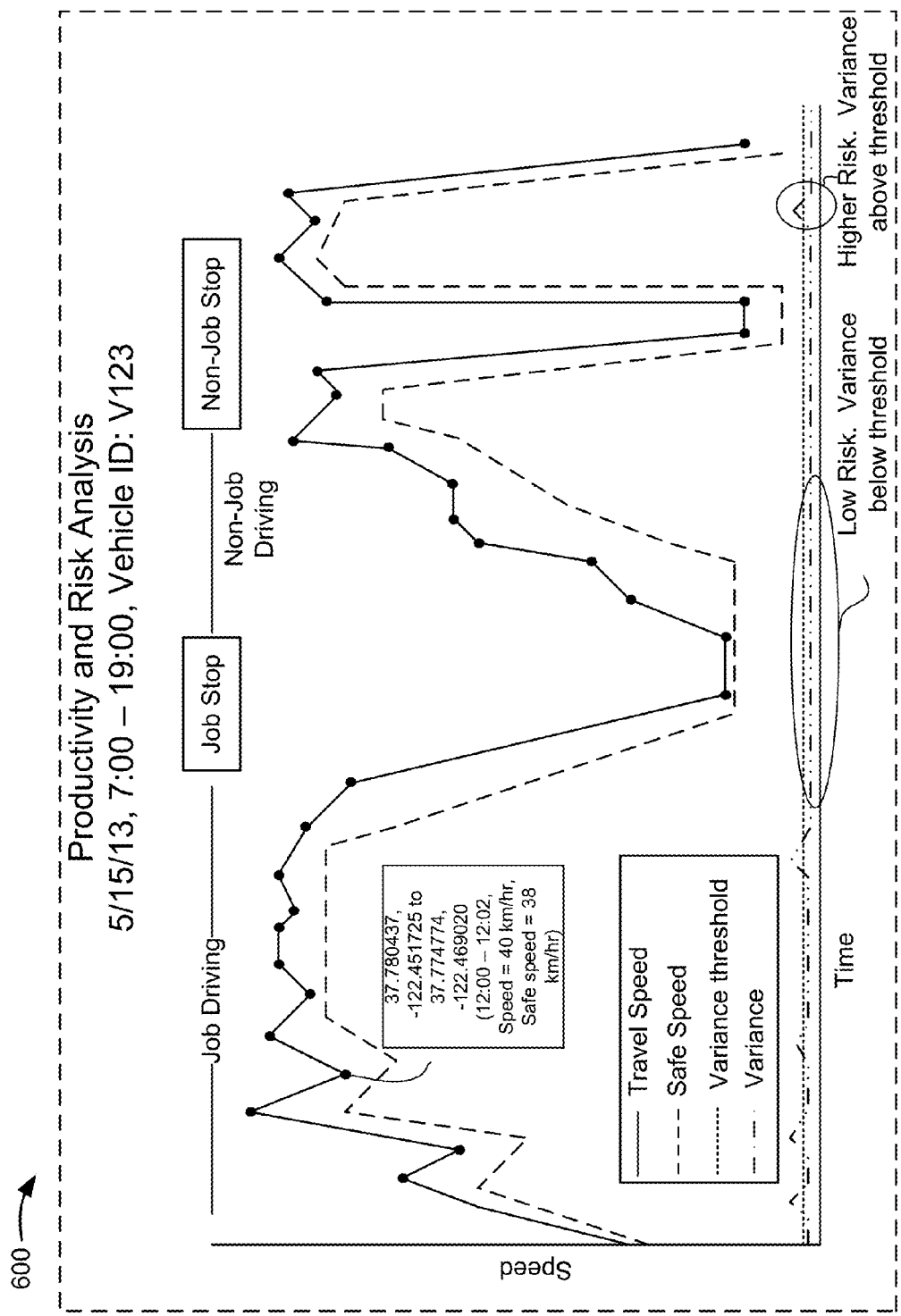

FIG. 6 illustrates an example implementation as described herein. In some implementations, FIG. 6 may correspond to an example of a productivity and risk analysis corresponding to an example presentation of position data records, processed data and/or behavior metrics received by client device 210 and displayed on interface 600 of client device 210. As shown in FIG. 6, the productivity and risk analysis may identify a speed of a particular vehicle (e.g., the vehicle having the vehicle ID of V123) during the time period of May 15, 2013, 7:00-19:00). Further, the productivity and risk analysis may identify the speed of the vehicle at different points in time. In some implementations, each data point, corresponding to speed of the vehicle at different points in time, may correspond to an average travel speed of the vehicle over a particular time period (e.g., a two minute time period, or some other time period), thereby compensating for idle time along a route and preventing an erratic presentation of speed when the vehicle idles.

In some implementations, a user may select data points of each speed measurement to obtain additional information regarding the data point (e.g., a time period associated with the data point, a speed of the vehicle during the time period, a position of the vehicle at the beginning of the time period, and a position of the vehicle at the end of the time period). In an example shown in FIG. 6, a data point may be selected to identify that the vehicle was traveling at 40 km/hr during the time period of 12:00-12:02, the vehicle was located at the geographic position corresponding to longitude/latitude coordinates 37.780437, −122.451725 at the beginning of the time period (e.g., at 12:00), and that the vehicle was located at the geographic position corresponding to longitude/latitude coordinates 37.774774, −122.469020) at the end of the time period (e.g., at 12:02).

In some implementations, the productivity and risk analysis may further identify a safe driving speed between the geographic positions at the start and end of the time period and behavior analysis data (e.g., mapping data that corresponds to the complexity of a route between the geographic positions at the start and end of the time period). In some implementations, the productivity and risk analysis may identify a variance between the travel speed and the safe speed and may identify a risk level based on the variance and a variance threshold. For example, the productivity and risk analysis may identify a relatively low risk when the variance is below the threshold and may identify a relatively higher risk when the variance exceeds the threshold.

In some implementations, the productivity analysis and risk may identify motion segments (e.g., time periods in which the vehicle was in motion, such as when the speed of the vehicle was greater than a particular threshold) and time durations of the motion segments. Further, the productivity analysis and risk may characterize the motion segments (e.g., as job-related driving, non-job-related driving, etc.). In some implementations, the productivity and risk analysis may identify stop segments and durations of the stop segments. Further, the productivity and risk analysis may characterize the stop segments (e.g., as job-related stops, non-job-related stops, etc.) and may identify a total job driving time and a total job stop time as part of a measure of worker productivity.

While a particular example is shown in FIG. 6, the above description is merely an example implementation. In practice, other examples are possible from what is described above in FIG. 6. For example, a productivity analysis and/or a risk analysis of a different time period than described above may be presented. Further, a productivity analysis and/or a risk analysis of multiple vehicles (e.g., vehicles associated with a particular fleet, company, organization, etc.) may be presented. Also, while a particular format of interface 600 is shown, in practice, interface 600 may have a different format and appearance than what is shown in FIG. 6.

Figure 7:
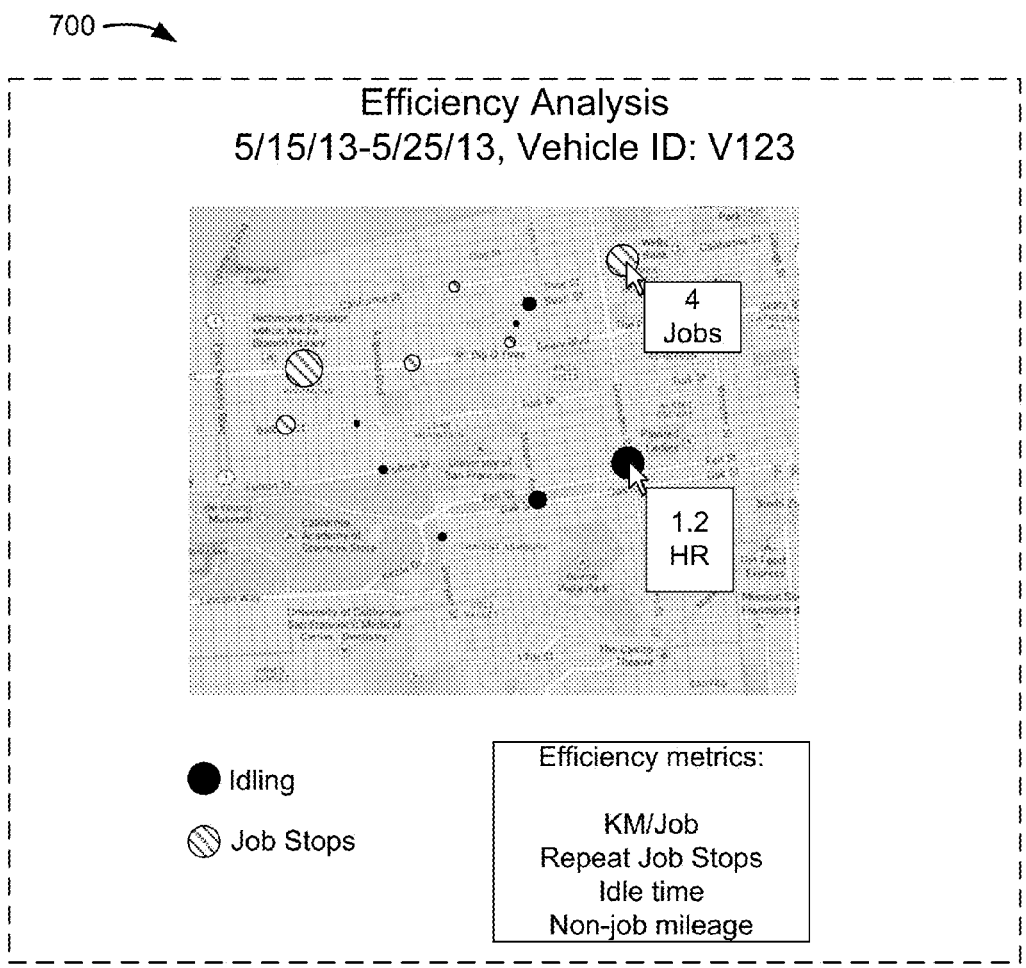

FIG. 7 illustrates an example implementation as described herein. In some implementations, FIG. 7 may correspond to an example of an efficiency analysis corresponding to an example presentation of processed data and/or behavior metrics received by client device 210 and displayed on interface 700 of client device 210. As shown in FIG. 7, the efficiency analysis may identify idling positions on a map (e.g., geographic positions where a particular vehicle had idled during a particular period of time). For example, the idling positions may be represented by an icon, such as a circle, point, image, etc. Further, the efficiency analysis may identify a cumulative amount of time that the vehicle had idled at each geographic position. In the example shown in FIG. 7, the efficiency analysis may identify idling positions for the vehicle having the vehicle ID "V123" during the time period from May 15, 2013-May 25, 2013. In some implementations, a user may select an icon on the map representing an idling position to receive information identifying the cumulative amount of idle time at the selected idling position. In some implementations, the size of the icon, representing an idle time, may be proportional to the cumulative idle time corresponding to the idle position.

In some implementations, the efficiency analysis may identify a job position on the map (e.g., a geographic position, identified on the map, where the particular vehicle had made one or more job-related stops during the particular time period). For example, the job position may be represented by an icon such as a circle, point, image, etc., and may include a different color and/or pattern than the icon(s) representing the idling position(s). In some implementations, a user may select an icon on the map representing a job position to receiving information regarding a number of times that the particular vehicle stopped at the corresponding geographic position associated with the icon. Additionally, or alternatively, the user may select the icon to receive some other information regarding the job position (e.g., information regarding a customer associated with the job position). In some implementations, the size of the icon, representing the job position, may be proportional to the number of times that the particular vehicle stopped at the corresponding geographic position.

In some implementations, the efficiency analysis may also include efficiency metrics, such as a number of kilometers driven per job stop, a number of repeat job stops per job position, a cumulative amount of vehicle idle time, information regarding non-job-related mileage, etc. In some implementations, information presented on interface 700 and corresponding to the efficiency analysis may be used to identify a measure of route efficiency and traffic density (e.g., based on idle times associated with a geographic position). Additionally, or alternatively, the efficiency analysis may be used to determine a measure of customer satisfaction. For example, customer satisfaction may be related to the number of repeat job stops for a particular job position associated with a particular customer (e.g., the measure of customer satisfaction may be inversely proportional to the number of repeat job stops).

While a particular example is shown in FIG. 7, the above description is merely an example implementation. In practice, other examples are possible from what is described above in FIG. 7. For example, an efficiency analysis of a different time period than described above may be presented. Further, an efficiency analysis of a group of multiple vehicles (e.g., vehicles associated with a particular fleet, company, organization, etc.) may be presented. Also, while a particular format of interface 700 is shown, in practice, interface 700 may have a different format and appearance than what is shown in FIG. 7.

Figure 8:
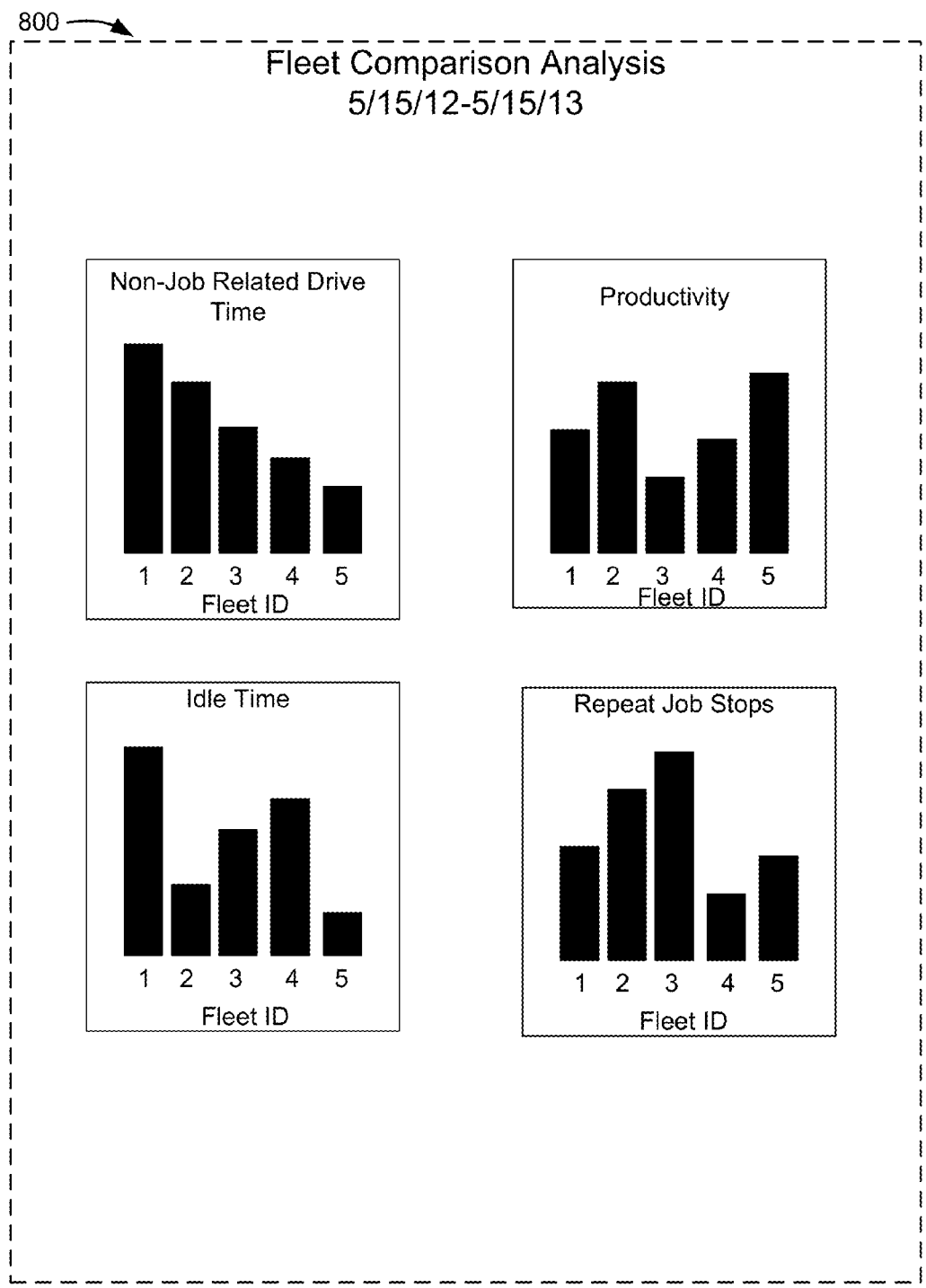

FIG. 8 illustrates an example implementation as described herein. In some implementations, FIG. 8 may correspond to an example of a fleet comparison analysis corresponding to an example presentation of processed data and/or behavior metrics received by client device 210 and displayed on interface 800 of client device 210. As shown in FIG. 8, the fleet comparison analysis may compare behavior metrics, associated with a particular time period, between multiple groups of vehicles (e.g., multiple fleets). As an example, the fleet comparison analysis may include a bar graph to compare non-job-related driving times between multiple fleets (e.g., fleets having the fleet IDs 1-5) during a particular time period (e.g., the time period from May 15, 2012-May 15, 2013). In some implementations, the fleet comparison analysis may include a bar graph to compare a measure of productivity between the fleets (e.g., based on behavior metrics that identify job-related driving time, and/or job relate stop times). In some implementations, the fleet comparison analysis may include a bar graph to compare a measure of average and/or cumulative vehicle idle times between the fleets. In some implementations, the fleet comparison analysis may include a bar graph to compare a measure of average and/or cumulative repeat job stops between the fleets (e.g., based on behavior metrics that identify job stops and geographic positions associated with the job stops).

While a particular example is shown in FIG. 8, the above description is merely an example implementation. In practice, other examples are possible from what is described above in FIG. 8. For example, a fleet comparison analysis of a different time period than described above may be presented. Also, while a particular format of interface 800 is shown, in practice, interface 800 may have a different format and appearance than what is shown in FIG. 8.

As described above, analytics server 240 may determine behavior metrics for different periods of time for a vehicle and/or for a group vehicles associated with a particular fleet, company, or organization. In some implementations, the behavior metrics for a vehicle may be determined based on correlating geographic position data of the vehicle with behavior analysis information (e.g., to determine vehicle driving/stoppage activity, and the type of vehicle driving/stoppage activity). In some implementations, behavior metrics for one vehicle or a group of vehicles may be compared to behavior metrics for another vehicle or group of vehicles. Based on the behavior metrics, the analytics server may determine the efficiency of vehicle routes, driving behavior, worker productivity, vehicle utilization, etc. (e.g., to identify inefficient driving routes, unproductive workers, repeated stops for a particular job site, etc.).

FIG. 9 is a diagram of example components of device 900. One or more of the devices described above (e.g., with respect to FIGS. 1 and 2) may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared (IR) receiver, a Bluetooth® radio (Bluetooth is a registered trademark of Bluetooth SIG, Inc.), radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving, by a device, a plurality of data records,
      each of the plurality of data records identifying a geographic position of a vehicle at a particular time;
   receiving, by the device, location information regarding geographic locations of one or more job sites;
   determining, by the device and based on the plurality of data records, a set of time periods during which the vehicle is not in motion;
   receiving, by the device and from a data collection device connected to an on-board vehicle diagnostics system, information regarding a geographic position of the vehicle during the particular time period during which the vehicle is not in motion;
   comparing the geographic position of the vehicle, during the particular time period during which the vehicle is not in motion, to the location information regarding the geographic locations of the one or more job sites;
   classifying the particular time period as a job-related stop when the geographic position of the vehicle, during the particular time period during which the vehicle is not in motion, is within a particular distance of a geographic location of a particular job site, of the one or more job sites, as determined based on the comparing, and
   classifying the particular time period as a non-job-related stop when the geographic position of the vehicle, during the particular time period during which the vehicle is not in motion, is not within a particular distance of a geographic location of a particular job site, of the one or more job sites, as determined based on the comparing; and
   outputting, by the device, information indicating the classification of the particular period of time.

2. The method of claim 1, further comprising:
   determining, based on the plurality of data records, a set of time periods during which the vehicle is in motion;
   determining a first speed of the vehicle during one of the one or more time periods during which the vehicle is in motion;
   determining a second speed of the vehicle during the one of the one or more time periods in which the vehicle is in motion;
   determining a risk score based on a variation between the first speed and the second speed, the risk score indicating whether the vehicle is being driven in a safe manner; and
   outputting the risk score.

3. The method of claim 1, further comprising:
   determining an amount of time that the vehicle was stopped, during the particular time period,
   wherein classifying the stop as a job-related stop or a non-job-related stop is further based on the amount of time that the vehicle was stopped during the particular time period.

4. The method of claim 1, further comprising:
   determining a measure of efficiency based on a measure of distance that the vehicle was in motion,
   a number of times that the vehicle was stopped at job locations, and
   a number of times that the vehicle was stopped at non-job-locations.

5. The method of claim 1, further comprising:
   determining a measure of productivity based on a measure of distance that the vehicle was in motion towards a job location and an amount of time that the vehicle was stopped at a job location.

6. The method of claim 1, wherein the device is a first device,
   wherein outputting the information, indicating the classification of the particular period of time, includes:
      outputting the information to a second device to cause the second device to display the information as part of a report, a graph, a chart, or a map.

7. A system comprising:
   a server device configured to:
      receive a plurality of data records,
         each of the plurality of data records identifying a geographic position of a vehicle at a particular time;
         receive, from a data collection device connected to an on-board vehicle diagnostics system, location information regarding geographic locations of one or more job sites;
      determine, based on the plurality of data records, a set of time periods during which the vehicle is not in motion;
      compare a geographic position of the vehicle, during the particular time period during which the vehicle is not in motion, to the location information regarding the geographic locations of the one or more job sites;
      classify the particular time period as a job-related stop when the geographic position of the vehicle, during the particular time period during which the vehicle is not in motion, is within a particular distance of a geographic location of a particular job site, of the one or more job sites, and
      classify the particular time period as a non-job-related stop when the geographic position of the vehicle, during the particular time period during which the vehicle is not in motion, is not within a particular distance of a geographic location of a particular job site, of the one or more job sites; and
      output information indicating the classification of the particular period of time.

8. The system of claim 7, wherein the device is further to:
   determine, based on the plurality of data records, a set of time periods during which the vehicle is in motion;
   determine a first speed of the vehicle during one of the one or more time periods during which the vehicle is in motion;
   determine a second speed of the vehicle during the one of the one or more time periods in which the vehicle is in motion;
   determine a risk score based on a variation between the first speed and the second speed, the risk score indicating whether the vehicle is being driven in a safe manner; and
   output the risk score.

9. The system of claim 7, wherein the device is further to:
   determine an amount of time that the vehicle was stopped, during the particular time period,
   wherein classifying the stop as a job-related stop or a non-job-related stop is further based on the amount of time that the vehicle was stopped during the particular time period.

10. The system of claim 7, wherein the device is further to:
   determine a measure of efficiency based on a measure of distance that the vehicle was in motion, a number of times that the vehicle was stopped at job locations, and a number of times that vehicle was stopped at non-job locations.

11. The system of claim 7, wherein the device is a first device,
wherein when outputting the information, indicating the classification of the particular period of time, the first device is further to output the behavior metrics to a second device to cause the second device to display the information as part of a report, a graph, a chart, or a map.

12. A non-transitory computer-readable medium for storing a plurality of instructions which, when executed by one or more processors associated with a device, cause the one or more processors to:
receive, from a data collection device connected to an on-board vehicle diagnostics system, a plurality of position data records,
each of the plurality of position data records identifying a geographic position of a vehicle at a particular time;
determine, based on the plurality of position data records, a set of time periods during which the vehicle is in motion;
identify, based on behavior analysis data, information identifying a first speed associated with a route traveled by the vehicle during one of the one or more time periods in which the vehicle is in motion;
determine a second speed corresponding to a speed the vehicle during the one of the one or more time periods in which the vehicle is in motion;
determine a measure of risk based on a variation between the first speed and the second speed; and
output information regarding the measure of risk.

13. The non-transitory computer-readable medium of claim 12, wherein the behavior analysis data includes information identifying a speed limit or a complexity of the route.

14. The non-transitory computer-readable medium of claim 12, wherein the set of time periods during which the vehicle is in motion is a first set of time periods, wherein the plurality of instructions further cause the one or more processors to:
receive location information regarding geographic locations of one or more job sites;
determine, based on the plurality of position data records and the location information regarding the geographic locations of the one or more job sites, a second set of time periods during which the vehicle is not in motion;
determine, based on the plurality of position data records and the location information regarding the geographic locations of the one or more job sites, whether a particular time period, of the second set of time periods, should be classified as a job-related stop or a non-job-related stop, the determining including:
comparing a geographic position of the vehicle, during the particular time period during which the vehicle is not in motion, to the location information regarding the geographic locations of the one or more job sites; and
output information indicating the classification of the particular period of time.

15. The non-transitory computer-readable medium of claim 14, wherein the classification is further based on an amount of time that the vehicle was stopped at a non-job location.

16. The non-transitory computer-readable medium of claim 12, wherein the plurality of instructions further cause the one or more processors to:
determine whether the variation between the first speed and the second speed exceeds a threshold variation,
wherein the determined measure of risk is based on whether the variation, between the first speed and the second speed, exceeds the threshold variation.

17. The method of claim 1, wherein the particular distance is a first distance, the method further comprising:
receiving location information regarding geographic locations of one or more non job sites,
wherein classifying the particular time period as a non-job-related stop is further based on determining that the geographic position of the vehicle, during the particular time period during which the vehicle is not in motion, is within a second distance of at least one non-job site, of the one or more non-job sites.

18. The method of claim 1, further comprising:
determining a time of day, that corresponds to the particular time period during which the vehicle is not in motion,
wherein classifying the particular time period as a non-job-related stop is further based on determining that the determined time of day corresponds to a time of day during which non-job-related stops are more likely to occur.

19. The system of claim 7, wherein the particular distance is a first distance, wherein the device is further to:
receive location information regarding geographic locations of one or more non job sites,
wherein classifying the particular time period as a non-job-related stop is further based on determining that the geographic position of the vehicle, during the particular time period during which the vehicle is not in motion, is within a second distance of at least one non-job site, of the one or more non-job sites.

20. The system of claim 7, wherein the device is further to:
determine a time of day, that corresponds to the particular time period during which the vehicle is not in motion,
wherein classifying the particular time period as a non-job-related stop is further based on determining that the determined time of day corresponds to a time of day during which non-job-related stops are more likely to occur.

* * * * *